UNITED STATES PATENT OFFICE 2,628,210

OXYGENATED POLYMERIZABLE ESTERS AS CURE ACCELERATORS AND AS COPOLYMERIZABLE MATERIALS

Paul T. Etchason and Henry F. Jones, Fort Wayne, Ind., assignors to General Electric Company, a corporation of New York No Drawing. Application July 29, 1950, Serial No. 176,770

25 Claims. (Cl. 260—45.4)

This invention is concerned with polymerizable compositions of matter. More particularly, the invention relates to polymerizable compositions of matter, methods of preparing the same, and products obtained therefrom. The invention is particularly concerned with a polymerizable composition comprising (a) a polymerizable organic compound, for example, one containing either a $CH_2=C<$ or $$-\underset{\underset{H}{|}}{C}=\underset{\underset{H}{|}}{C}-$$

grouping, etc., and (b) either catalytic amounts or copolymerizable amounts of an oxygenated derivative of a compound corresponding to the general formula

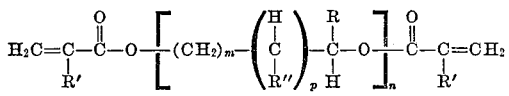

where R is a member selected from the class consisting of hydrogen, $-CH_3$, $-C_2H_5$, $-CH_2OH$,

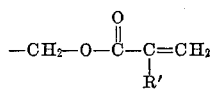

R' is a member selected from the class consisting of hydrogen, chlorine and methyl and ethyl radicals, R'' is a member selected from the class consisting of H, $-OH$, and

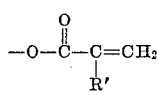

m is an integer equal to at least 1, for example, from 1 to 8 or higher, more particularly from 1 to 4, inclusive, n is an integer equal to at least 2, for example, from 2 to 20 or more, and p is one of the following: 0, 1.

The oxygenated derivatives described above are more particularly referred to as "anaerobic monomers" and are disclosed and claimed in the copending application of Birger W. Nordlander and Robert E. Burnett, Serial No. 176,768, filed concurrently herewith and assigned to the same assignee as the present invention. In view of the adequate disclosures and teachings in the latter application, a description of the oxygenated derivatives corresponding to the above-identified formula (or anaerobic monomers" as they will hereinafter be called) which are employed in the practice of our invention will not be described further in the instant application, since by reference the Nordlander and Burnett application is made a part of the instant application.

In the aforementioned Nordlander and Burnett application are disclosed and claimed unique compositions of matter obtained by oxygenating compounds corresponding to the general formula described above. These oxygenated derivatives have the unique property of remaining non-polymerizable at around 80° C. or less as long as oxygen is passed through the oxygenated derivative, but as soon as oxygen is excluded therefrom, polymerization of the oxygenated compound proceeds rapidly to give a solid, substantially infusible and insoluble product at room temperatures. We have now discovered that small amounts of these oxygenated compositions of matter can be used to effect polymerization of various polymerizable monomers containing, for example, a polymerizable $CH_2=C<$ grouping or a polymerizable $$-\underset{\underset{H}{|}}{C}=\underset{\underset{H}{|}}{C}-$$

grouping. We have also found that these anaerobic monomers can be copolymerized in all proportions with various copolymerizable organic compounds. More particularly, we have discovered that small amounts of these anaerobic monomers can be used to polymerize organic monomers which are polymerizable by the usual peroxy polymerization accelerators (e. g., benzoyl peroxide, tertiary butyl perbenzoate, etc.) to give products whose properties are improved and in many cases different from those of polymerized compositions using the usual polymerization accelerator as, for example, peroxy catalysts, ordinarily employed in the polymerization of monomeric compositions.

In accordance with one phase of our invention, the use of the anaerobic monomers as cure accelerators for the polymerizable monomers imparts a rapid cure to the monomer with or without the application of heat whether the system for polymerization used is in bulk, emulsion, suspension, etc. These anaerobic monomers effect polymerization of such monomers, or polymerizable compositions, even though they are in contact with materials which ordinarily inhibit polymerization, for instance, copper, cresols, phenols such as, for example, phenolic resins, etc. In many cases the use of the anaerobic monomer as a cure accelerator causes a rise in the softening point of thermoplastics. The monomeric materials containing the anaerobic monomers or polymerization accelerators polymerize without corrosive effects when in contact with materials which are ordinarily corroded by the usual polymerization procedures. Finally, the small amounts of anaerobic monomer appear to impart increased degrees of hardness, abrasion resistance, adhesion, etc. to the finally polymerized product.

The particular anaerobic monomer used is not critical and any one of the many disclosed and taught in the aforementioned Nordlander and Burnett application may be used. The amount of anaerobic monomer employed for accelerating the cure of the polymerizable monomer may be varied within wide limits without departing from the scope of the invention. Thus, we may employ, for example, from about 0.1 to 5% or more, by weight, of the anaerobic monomer, based on the weight of the polymerizable monomer or monomers. Generally, in many cases we have found that amounts equal to from about 0.5 to 4 per cent, by weight, of the anaerobic monomer are adequate for giving the desirable properties described above. It will, of course, be apparent to those skilled in the art that larger or smaller amounts may be employed. Larger amounts are usually unnecessary as far as polymerization acceleration is concerned.

The general procedure for effecting polymerization of the organic polymerizable monomers comprises mixing the anaerobic monomer either in catalytic amounts or copolymerizable amounts with the particular organic monomer and either allowing the mixture to remain at room temperature or else subjecting it to elevated temperatures of the order of from about 50° to 125° C. or higher, for example, from 55° to about 150° C., for varying lengths of time. The time within which polymerization may be effected may vary depending, for instance, upon the anaerobic monomer employed, temperature at which polymerization is caused to take place, the polymerizable monomer used, the amount of anaerobic monomer present in the polymerizable composition, etc.

As pointed out above, the anaerobic monomers may be used to polymerize various organic materials. Among these may be mentioned, for example, compounds containing a polymerizable $CH_2=C<$ grouping. Examples of such compositions of matter are, for instance, dienes, e. g., butadiene, isoprene, pirerylene, etc.; a vinyl-substituted aromatic hydrocarbon, e. g., styrene, methyl styrene, divinyl benzene, vinyl fluorenes; acenaphthylene, etc.; arcylic acid and its derivatives, e. g., methacrylic acid, acrylonitrile, acrylamide, methacrylonitrile, methacrylamide, esters of acrylic and methacrylic acids, for example, methyl acrylate, ethyl acrylate, methyl methacrylate, etc.; and ethylenically unsaturated halogenated or unhalogenated aliphatic hydrocarbons, e. g., ethylene, chloroethylenes, fluoroethylenes, chlorofluoroethylenes, etc., and the like.

In order that those skilled in the art may better understand how the present invention may be practiced, the following examples are given by way of illustration and not by way of limitation. All parts are by weight.

EXAMPLE 1

In this example a resinous composition comprising 2 parts styrene and 1 part of a polyester resin comprising dipropylene glycol maleate was mixed with 1%, by weight, thereof of oxygenated tetraethylene glycol dimethacrylate prepared in accordance with the procedure described in the aforementioned Nordlander and Burnett application, Serial No. 176,768. A bare copper wire was inserted in the polymerizable mixture and the total assembly heated for four hours at 85° C. At the end of this time it was found that the assembly was tack-free, rigid and solid, and showed no evidence of corrosion of the copper. In contrast to this, when the same resin was mixed with 1%, by weight, of benzoyl peroxide and a copper wire inserted in the same manner, and the total assembly heated for four hours at 85° C., it was found that the resin was tacky and spongy, and the copper showed extensive corrosion in the resinous area surrounding the copper wire. Even after 16 hours at 85° C., although the resin was tack-free, it was cheesy.

EXAMPLE 2

In this example bare copper strips were coated with a polymerizable composition comprising the resinous material described in Example 1 and containing 1%, by weight, oxygenated tetraethylene glycol dimethacrylate. The copper strips were placed together with the coated surfaces adjacent each other so that they overlapped and were allowed to remain at room temperature (about 25° C.) for 16 hours. At the end of this time it was found that the average tensile shear strength was of the order of about 210 p. s. i. In contrast to the above, when the same procedure was employed for the polymerizable mixture containing 1%, by weight, benzoyl peroxide, in place of the oxygenated tetraethylene glycol dimethacrylate, the shear strength of such an assembly was about 65 p. s. i. after 16 hours at 25° C.

EXAMPLE 3

Monomeric styrene was mixed with 1%, by weight, tetraethylene glycol dimethacrylate which had been subjected to oxygenation in accordance with the procedure described in the above-mentioned Nordlander and Burnett application. The mixture of ingredients was placed in a tube and heated at 85° C. for 16 hours. At the end of this time it was found that the casting was rigid and tack-free and showed no evidence of cracking or bubbling. In contrast to this, when 1%, by weight, of benzoyl peroxide was substituted for the oxygenated tetraethylene glycol dimethacrylate anaerobic monomer, and the monomeric styrene subjected to polymerization conditions similar to the above, it was found that shortly after placing the polymerizable mixture in the 85° C. environment, the sample began polymerizing rapidly to a point that it "ran away" as evidenced by the fact that the casting bubbled and cracked badly. Approximately half of the product was blown out of the reaction tube.

EXAMPLE 4

About 1%, by weight, oxygenated tetraethylene glycol dimethacrylate was mixed with butyl methacrylate and the mixture heated at 85° C. for 8 hours to yield a hard, homogenous, clear polymer. The polymer appeared to have a satisfactory softening point.

EXAMPLE 5

When a mixture of about 2 parts styrene and 3 parts dipropylene glycol maleate was mixed with 1½%, by weight, oxygenated tetraethylene glycol dimethacrylate, it was found that around room temperature (25° C.) the mixture gelled in 4 hours and was converted to the hard solid state in around 16 hours without any evidence that the temperature at any time rose above 35° C. In contrast to this, when the same mixture of styrene and dipropylene glycol maleate was mixed with 1½%, by weight, thereof benzoyl peroxide, it required a much longer period of time to gel this mixture and, in addition, even after 36 hours at room temperature there was still no evidence that the polymer was completely cured. Moreover, the heat of polymerization was well above the 35° C. noted above and caused the polymer to crack.

EXAMPLE 6

The following ingredients were charged to and sealed in a glass tube:

| | Parts |
|---|---|
| Butadiene | 30 |
| Styrene | 10 |
| Oxygenated tetraethylene glycol dimethacrylate | 1 |
| Distilled water containing 5%, by weight, of an emulsifying agent (alkyd aryl polyether alcohol known as Triton N E) | 66 |

The sealed glass tube was placed in an oven maintained at a temperature of around 50° C. and heated at this temperature for 16 hours. At the end of this time the tube was removed from the oven, cooled, and the contents poured into 2000 parts of distilled water with stirring. Thereafter, approximately 250 parts of a 5% sodium chloride solution was added and the coagulated material filtered and dried. The resultant product was a gummy, tough, light-colored copolymer.

EXAMPLE 7

The following ingredients were added to a reaction flask equipped with a reflux condenser:

| | Parts |
|---|---|
| Acetone | 238 |
| Vinyl acetate | 140 |
| Oxygenated tetraethylene glycol dimethacrylate | 3.5 |

The mixture was heated at its reflux temperature (60–65° C.) for 3 hours, at the end of which time the mixture was cooled and the acetone removed. The resultant product was a tough, flexible, light-colored material.

It will, of course, be apparent to those skilled in the art that other anaerobic monomers, many examples of which are disclosed and taught in the aforementioned Nordlander and Burnett application Serial No. 176,768, may be employed in place of the oxygenated tetraethylene glycol dimethacrylate employed in the foregoing examples without departing from the scope of the invention. Different amounts of the anaerobic monomer may also be used in accordance with the disclosures and teachings described in the present application. Among such other anaerobic monomers may be mentioned, for example, oxygenated polyethylene glycol dimethacrylate, diethylene glycol dimethacrylate, dipropylene glycol dimethacrylate, tetraethylene glycol diacrylate, diglycerol tetramethacrylate, etc.

In addition to the polymerizable compounds employed in the foregoing examples and in addition to those disclosed previously, we may use other polymerizable materials, for instance, any compound containing a polymerizable $$\begin{matrix} H & H \\ -C=C- \end{matrix}$$

grouping or $CH_2=C<$ grouping in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and alpha-substituted acrylic acids, vinyl esters and halides, methylene malonic esters, mono- and poly-allyl compounds, e. g., the di-, tri-, tetra- (and higher) allyl derivatives. For instance, the polymerizable material may be an unsaturated alkyd resin, or it may be a polyallyl ester of an inorganic polybasic acid of a saturated or unsaturated aliphatic polycarboxylic acid or of an aromatic polycarboxylic acid, or it may be mixtures of such compositions, etc. Specific examples of compounds or mixtures of compounds that may be employed, in addition to those hereinbefore mentioned, are:

| | |
|---|---|
| Benzyl acrylate | Glyceryl triacrylate |
| Benzyl methacrylate | Ethylene glycol diacrylate (ethylene diacrylate) |
| Methyl alpha-chloroacrylate | Diethylene glycol maleate |
| Ethyl alpha-bromoacrylate | Dipropylene glycol fumarate |
| Propyl alpha-chloroacrylate | Diallyl citraconate |
| Para-chlorostyrene | Divinyl biphenyl |
| Allyl acrylate | Vinyl methyl ketone |
| Diethylene itaconate | Cyclopentadiene |
| Diethyl maleate | 2-chloro-butadiene-1,3- (chloroprene) |
| Dimethyl fumarate | 2,3-dimethyl-butadiene-1,3 |
| Para-chlorobenzyl acrylate | Chlorinated methyl-styrenes |
| Diallyl succinate | Chlorinated vinylnaphthalenes |
| Diallyl fumarate | Hexadiene-1,5 |
| Diethyl itaconate | 2-cyano-butadiene-1,3 |
| Allyl methacrylate | Dimethallyl maleate |
| Tetra-allyl silane | Dimethallyl itaconate |
| Diallyl phthalate | Dimethallyl phthalate |
| Methallyl acrylate | Amyl acrylate |
| Di- and tri-chlorostyrenes | Hexyl methacrylate |
| Chlorinated divinylbenzenes | Triallyl citrate |
| Vinyl methyl ether | Triallyl aconitate |
| Vinyl ethyl ether | Vinyl acetate |
| Divinyl ether | Vinyl propionate |
| Methylene methyl malonate | Vinyl butyrate |
| Methylene ethyl malonate | |
| Vinyl chloride | |
| Vinylidene chloride | |
| Diethylene glycol dimethacrylate (diethylene dimethacrylate) | |

In addition to effecting acceleration of polymerization of organic polymerizable materials using small amounts of the anaerobic monomers described above as polymerization accelerators, we have also found that these anaerobic monomers may be copolymerized under usual polymerizing conditions well known in the art with other copolymerizable monomers, for example, those containing a polymerizable $$\begin{matrix} H & H \\ -C=C- \end{matrix}$$

grouping, for instance, a terminal $CH_2=C<$ grouping, e. g., styrene, butadiene, vinyl acetate, etc., or a polymerizable compound containing a $$\begin{matrix} H & H \\ -C=C- \end{matrix}$$

grouping, e. g., diethylene glycol maleate, dipropylene glycol fumarate, diethyl maleate, etc. Many examples of compounds containing such polymerizable groupings have been disclosed previously as examples of polymerizable compositions containing a polymerizable $$\begin{matrix} H & H \\ -C=C- \end{matrix}$$

grouping which can be polymerized by using the anaerobic monomers as polymerization accelerators. No other polymerization catalyst is required. In effecting copolymerization, we may employ from 5 to 99 per cent, e. g., from 10 to 75 per cent, by weight, of the anaerobic monomer, based on the total weight of the latter and the other copolymerizable monomer or monomers. The following example illustrates the effect of mixing oxygenated tetraethylene glycol dimethacrylate with various copolymerizable monomers for copolymerization purposes.

EXAMPLE 8

In this example oxygenated tetraethylene glycol dimethacrylate was mixed with the following copolymerizable monomers in a ratio of 1 to 1, by volume. Small samples of the resulting mixtures were placed between glass slides and allowed to stand at room temperature (about 25° C.). Gelation times were determined in the usual manner. These test samples were left undisturbed at room temperature for 5 days, then pried apart and the polymer films examined for completeness of polymerization by determining their solubility in acetone.

*Table I*

| Sample No. | Composition | Gelation Time Between Glass at 25° C. | Percent by Weight Polymer Insoluble in Acetone |
|---|---|---|---|
| 1 | Anaerobic monomer alone. | 18 minutes | 98 |
| 2 | Anaerobic monomer plus lauryl methacrylate. | 5 hours | 96 |
| 3 | Anaerobic monomer plus n-butyl methacrylate. | 30 minutes | 97 |
| 4 | Anaerobic monomer plus n-butyl acrylate. | 25 minutes | 98 |
| 5 | Anaerobic monomer plus diallyl phthalate. | 40 minutes | 65 |
| 6 | Anaerobic monomer plus allyl diglycol carbonate. | 70 minutes | 66 |
| 7 | Anaerobic monomer plus styrene. | 83 minutes | [1] 97 |
| 8 | Anaerobic monomer plus vinyl acetate. | 60 minutes | 94 |
| 9 | Anaerobic monomer plus acrylonitrile. | 70 minutes | 99 |

[1] This film was also found to be insoluble in benzene.

The fact that practically insoluble polymers were produced indicates that nearly complete copolymerization occurred. Preliminary evaluation of the adhesive strength of the polymer films to the glass indicated that the copolymer films containing lauryl methacrylate, n-butyl methacrylate, n-butyl acrylate, and styrene showed somewhat greater adhesion to the glass surface than the control sample #1. The other films were similar to the control in this respect.

EXAMPLE 9

In a separate series of tests lauryl methacrylate, n-butyl methacrylate, n-butyl acrylate and styrene were each copolymerized in bulk in a long narrow glass tube with oxygenated tetraethylene glycol dimethacrylate (33 min. gelation time between glass slides at 25° C.) in a ratio of 1 to 1, by volume. The open tubes were allowed to stand for 8 days at room temperature after which the polymeric products were removed and examined, and found to be essentially uniform, hard solids. All were transparent except the one prepared from lauryl methacrylate and the anaerobic monomer which was translucent. Both lauryl methacrylate and n-butyl acrylate were found to impart considerable flexibility to the copolymers while n-butyl methacrylate with styrene appeared to increase the toughness as compared with the polymerized composition prepared from the anaerobic monomer alone.

EXAMPLE 10

About 60 parts diallyl phthalate and 40 parts oxygenated tetraethylene glycol dimethacrylate were mixed together and heated at around 83.5° C. It was found that after 2.3 minutes the mixture had gelled and that in a short period of time a solid, hard copolymer was obtained.

EXAMPLE 11

A mixture of copolymerizable ingredients comprising 50 parts diallyl phthalate and 50 parts diethylene glycol maleate was prepared and to samples of this mixture were added 10%, 5%, and 2%, by weight, thereof oxygenated tetraethylene glycol dimethacrylate. Each of the samples was heated at 80° C. to determine the time of gelation. The sample containing 10% of the anaerobic monomer gelled in 9 minutes, the sample containing 5% anaerobic monomer gelled in 18 minutes, and the sample containing 2% anaerobic monomer gelled in 45 minutes. The hard polymers obtained by further heating the material showed no evidence of cracks.

EXAMPLE 12

To 100 parts diethylene glycol maleate were added 5 parts oxygenated tetraethylene glycol dimethylacrylate and the mixture heated for 24 hours at 125° C. to give a tough, flexible, thoroughly cured product. When the diethylene glycol maleate was heated alone under similar conditions with 1%, by weight, thereof benzoyl peroxide, the sample developed cracks.

It is apparent from the foregoing examples that many monomers will copolymerize with the anaerobic monomers to form copolymers exhibiting enhanced mechanical properties. It will, of course, be apparent to those skilled in the art that other copolymerizable monomers, many of which have been listed above previously, may be used in place of those described in the examples above without departing from the scope of the invention. Generally, we may use from about 15 to 95%, by weight, of the anaerobic monomer based on the total weight of the latter and the copolymerizable monomer. We have found that ranges of from 25 to 75 per cent of the anaerobic monomer are adequate to give highly desirable properties.

In addition to effecting acceleration of the polymerization of the individual or polymerizable organic monomers or effecting copolymerization of the anaerobic monomers, it will be apparent that we may use mixtures of polymerizable organic monomers with the same results described above. The polymers and copolymers produced in accordance with this invention may in general be modified to fill the requirements of the specific applications for which they may not ordinarily be suitable. For example, plasticizers and fillers may be added to the monomers or mixtures of monomers prior to polymerization thereof or they may be added after the polymerization has been completed.

In general, plasticizers commonly used for polymers and copolymers known to the art may be employed in plasticizing the polymeric materials embraced by this invention. The selection of the proper plasticizers depends largely upon the properties desired in the final product. Useful molding composition may also be prepared by mixing the homopolymers or copolymers with suitable fillers, such as, for example, alpha cellulose, mica dust, titanium dioxide, talc, zinc oxide, magnesium oxide, asbestos, quartz, wood flour, cellulose, or wool fibers, etc.

The polymeric materials prepared in accordance with our invention have a variety of commercial applications. They may be used alone or in combination with other insulating materials, for example, paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the products of polymerization described previously as an essential ingredient.

Paper-insulated capacitors wherein paper impregnated with a composition comprising a polymer or copolymer prepared in accordance with our invention constitutes the dielectric material, is a more specific example of the use of a composition of our invention in electrical applications. Our polymers and copolymers may also be employed as cable impregnants, in impregnating electrical coils, as filling compound in potheads and cable joints, and in numerous other electrical applications. The device to be treated may be impregnated or filled with the polymerizable mixture (for example, the monomer, mixture of monomers, mixture of partial polymers or copolymers, or mixture of monomer and partial polymer), and polymerization effected in situ.

What we claim as new and desire to secure by Letters Patent of the United States is:

1. A polymerizable composition comprising (a) an oxygenated derivative of a compound having a final active oxygen content of at least 0.1% corresponding to the general formula

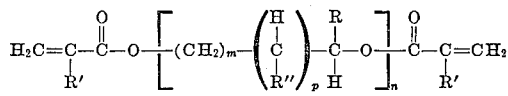

where R is a member selected from the class consisting of hydrogen —CH₃, —C₂H₅, —CH₂OH, and

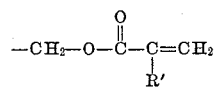

radicals, R' is a member selected from the class consisting of hydrogen, chlorine, and the methyl and ethyl radicals, R'' is a member selected from the class consisting of hydrogen, —OH radical, and

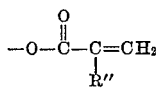

radical, m is an integer equal to at least 1, n is an integer equal to at least 2, and p is one of the following: 0, 1 and (b) an organic polymerizable monomer containing a polymerizable group selected from the class consisting of the CH₂=C< grouping and the

grouping of an alpha unsaturated alpha beta polycarboxylic acid.

2. A polymerizable composition of matter as in claim 1 wherein the polymerizable monomer comprises styrene.

3. A polymerizable composition of matter as in claim 1 wherein the polymerizable monomer comprises methyl methacrylate.

4. A polymerizable composition of matter as in claim 1 wherein the polymerizable monomer comprises an unsaturated alkyd resin.

5. A polymerizable composition of matter as in claim 1 wherein the polymerizable monomer comprises an unsaturated alkyd resin and a polyallyl ester of a polycarboxylic acid.

6. A polymerizable composition comprising (a) styrene and (b) an oxygenated derivative of tetraethylene glycol dimethacrylate having a final active oxygen content of at least 0.1%.

7. A polymerizable composition comprising (a) styrene and (b) an oxygenated derivative of dipropylene glycol dimethacrylate having a final active oxygen content of at least 0.1%.

8. A polymerizable composition comprising (a) styrene and (b) an oxygenated derivative of polyethylene glycol dimethacrylate having a final active oxygen content of at least 0.1%.

9. A polymerizable composition comprising (a) styrene and (b) an oxygenated derivative of diethylene glycol dimethacrylate having a final active oxygen content of at least 0.1%.

10. A polymerizable composition comprising (a) styrene, (b) an unsaturated alkyd resin, (c) a polyallyl ester of a polycarboxylic acid, and (d) a polymerization accelerator for (a), (b) and (c) comprising an oxygenated derivative of tetraethylene glycol dimethacrylate having a final active oxygen content of at least 0.1%.

11. A polymerizable composition comprising (a) styrene, (b) diethylene glycol maleate, (c) diallyl phthalate, and (d) an oxygenated derivative of tetraethylene glycol dimethacrylate having a final active oxygen content of at least 0.1%.

12. The polymerized product of claim 1.
13. The polymerized product of claim 6.
14. The polymerized product of claim 7.
15. The polymerized product of claim 8.
16. The polymerized product of claim 9.
17. The polymerized product of claim 10.
18. The polymerized product of claim 11.

19. The process which comprises (1) forming a mixture of ingredients comprising (a) an oxygenated derivative of a compound having a final active oxygen content of at least 0.1% and corresponding to the general formula

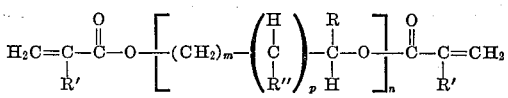

where R is a member selected from the class consisting of hydrogen, —CH₃, —C₂H₅, —CH₂OH, and

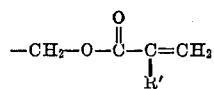

radicals, R' is a member selected from the class consisting of hydrogen, chlorine, and the methyl and ethyl radicals, R'' is a member selected from the class consisting of hydrogen, —OH radical, and

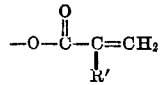

radical, m is an integer equal to at least 1, n is an integer equal to at least 2, and p is one of the following: 0, 1 and (b) another polymerizable organic monomer containing a polymerizable group selected from the class consisting of the CH₂=C< grouping and the

grouping of an alpha unsaturated alpha beta polycarboxylic acid, and (2) subjecting the mixture of ingredients to polymerizing conditions by heating the mixture of ingredients at temperatures ranging from above room temperature to about 150° C.

20. The process for effecting polymerization of a polymerizable monomer which comprises (1)

forming a mixture of ingredients comprising (a) styrene and (b) oxygenated tetraethylene glycol dimethacrylate having a final active oxygen content of at least 0.1%, and (2) subjecting the mixture of ingredients to polymerizing conditions by heating the mixture of ingredients at temperatures ranging from above room temperature to about 150° C.

21. The process for effecting polymerization of a peroxy polymerizable monomer which comprises (1) forming a mixture of ingredients comprising (a) styrene and (b) oxygenated dipropylene glycol dimethacrylate having a final active oxygen content of at least 0.1%, and (2) subjecting the mixture of ingredients to polymerizing conditions by heating the mixture of ingredients at temperatures ranging from above room temperature to about 150° C.

22. The process for effecting polymerization of a peroxy polymerizable monomer which comprises (1) forming a mixture of ingredients comprising (a) styrene and (b) oxygenated polyethylene glycol dimethacrylate having a final active oxygen content of at least 0.1%, and (2) subjecting the mixture of ingredients to polymerizing conditions by heating the mixture of ingredients at temperatures ranging from above room temperature to about 150° C.

23. The process for effecting polymerization of a peroxy polymerizable composition which comprises (1) forming a mixture of ingredients comprising (a) styrene and (b) an oxygenated diethylene glycol dimethacrylate having a final active oxygen content of at least 0.1%, and (2) subjecting the mixture of ingredients to polymerizing conditions by heating the mixture of ingredients at temperatures ranging from above room temperature to about 150° C.

24. The process for effecting polymerization of a peroxy polymerizable monomer which comprises (1) forming a mixture of ingredients comprising (a) styrene and (b) oxygenated tetraethylene glycol diacrylate, and (2) subjecting the mixture of ingredients to polymerizing conditions by heating the mixture of ingredients at temperatures ranging from above room temperature to about 150° C.

25. The process for effecting polymerization of a polymerizable composition which comprises (1) forming a mixture of ingredients comprising (a) styrene, dipropylene glycol maleate, and diallyl phthalate and (b) a polymerization accelerator for (a) comprising oxygenated tetraethylene glycol dimethacrylate having a final active oxygen content of at least 0.1%, and (2) subjecting the mixture of ingredients to polymerizing conditions by heating the mixture of ingredients at temperatures ranging from above room temperature to about 150° C.

PAUL T. ETCHASON.
HENRY F. JONES.

REFERENCES CITED

The following references are of record in the file of this patent:

UNITED STATES PATENTS

| Number | Name | Date |
|---|---|---|
| 2,129,722 | Woodhouse | Sept. 13, 1938 |
| 2,319,576 | Agens | May 18, 1943 |
| 2,370,578 | Pollack et al. | Feb. 27, 1945 |
| 2,407,479 | D'Alelio | Sept. 10, 1946 |
| 2,465,991 | Anderson et al. | Apr. 5, 1949 |

FOREIGN PATENTS

| Number | Country | Date |
|---|---|---|
| 549,234 | Great Britain | Nov. 12, 1942 |